US011920963B2

(12) United States Patent
Sternklar et al.

(10) Patent No.: US 11,920,963 B2
(45) Date of Patent: Mar. 5, 2024

(54) METHOD AND SYSTEM FOR OPTICAL FIBER SENSING

(71) Applicant: Ariel Scientific Innovations Ltd., Ariel (IL)

(72) Inventors: Shmuel Sternklar, Yakir (IL); Egor Liokumovitch, Ariel (IL)

(73) Assignee: Ariel Scientific Innovations Ltd., Ariel (IL)

( * ) Notice: Subject to any disclaimer, the term of this patent is extended or adjusted under 35 U.S.C. 154(b) by 213 days.

(21) Appl. No.: 17/413,558

(22) PCT Filed: Dec. 12, 2019

(86) PCT No.: PCT/IL2019/051364
§ 371 (c)(1),
(2) Date: Jun. 13, 2021

(87) PCT Pub. No.: WO2020/121311
PCT Pub. Date: Jun. 18, 2020

(65) Prior Publication Data
US 2022/0049979 A1  Feb. 17, 2022

Related U.S. Application Data

(60) Provisional application No. 62/778,967, filed on Dec. 13, 2018.

(51) Int. Cl.
*G01D 5/353* (2006.01)
*G01K 11/322* (2021.01)
*G01L 1/24* (2006.01)

(52) U.S. Cl.
CPC ..... *G01D 5/35358* (2013.01); *G01D 5/35377* (2013.01); *G01K 11/322* (2021.01); *G01L 1/242* (2013.01)

(58) Field of Classification Search
CPC .......... G01D 5/35361; G01D 5/35364; G01D 5/35377
See application file for complete search history.

(56) References Cited

U.S. PATENT DOCUMENTS

| 5,291,267 A | 3/1994 | Sorin et al. |
| 6,542,228 B1 * | 4/2003 | Hartog ............... G01M 11/3127 356/73.1 |

(Continued)

FOREIGN PATENT DOCUMENTS

| EP | 0348235 | 3/1994 |
| WO | WO 2020/121311 | 6/2020 |

OTHER PUBLICATIONS

International Preliminary Report on Patentability dated Jun. 24, 2021 From the International Bureau of WIPO Re. Application No. PCT/IL2019/051364. (6 Pages).

(Continued)

*Primary Examiner* — Herbert K Roberts

(57) ABSTRACT

A method of optical sensing comprises coupling an excitation optical signal into a first optical fiber to induce Rayleigh backscattering, thereby providing a backscattered signal. The backscattered signal is optically amplified in the first optical fiber, thereby providing an amplified backscattered signal. The amplified backscattered signal is coupled into a second optical fiber and is optically re-amplifying in the second optical fiber.

20 Claims, 9 Drawing Sheets

(56) References Cited

U.S. PATENT DOCUMENTS

| | | | |
|---|---|---|---|
| 2005/0002017 A1* | 1/2005 | Haran | G01M 3/18 |
| | | | 356/73.1 |
| 2005/0117830 A1 | 6/2005 | Hartog et al. | |
| 2011/0199607 A1 | 8/2011 | Kanellopoulos et al. | |
| 2013/0301978 A1 | 11/2013 | Meyer et al. | |
| 2017/0115138 A1* | 4/2017 | Sternklar | G01M 11/3109 |

OTHER PUBLICATIONS

International Search Report and the Written Opinion dated Mar. 18, 2020 From the International Searching Authority Re. Application No. PCT/IL2019/051364. (10 Pages).

Beugnot et al. "Distributed Brillouin Sensing With Sub-Meter Spatial Resolution: Modeling and Processing", Optics Express, 19(8): 7381-7397, Published Online Apr. 1, 2011.

Boyd "The Nonlinear Optical Susceptibility ff.", Nonlinear Optics, 3rd Ed., p. 1-613, Oct. 2007.

Champavere "New OTDR Measurement and Monitoring Techniques", Optical Fiber Communication Conference, OFC 2014, San Francisco, CA, USA, Mar. 9-13, 2014, OSA Technical Digest, Paper W3D.1, 3 P., Mar. 9, 2014.

Koyamada et al. "Fiber-Optic Distributed Strain and Temperature Sensing With Very High Measurand Resolution Over Long Range Using Coherent OTDR", Journal of Lightwave Technology, 27(9): 1142-1146, Published Online Apr. 24, 2009.

Minardo et al. "High-Spatial Resolution DPP-BOTDA by Real-Time Balanced Detection", IEEE Photonics Technology Letters, 26(12): 1251-1254, Published Online Apr. 30, 2014.

Pan et al. "Compensation Method for Blind Segments of Distributed Optical-Fiber Vibration Sensor Based on Differential-Coherent OTDR", Optical Fiber Communication Conference, OFC 2014, San Francisco, CA, USA, Mar. 9-13, 2014, OSA Technical Digest, Paper Th2A.21, 3 P., Mar. 9, 2014.

Zhao et al. "Real-Time On-Line Monitoring System of 110kV Submarine Cable Based on BOTDR", Sensors and Actuators A: Physical, 216: 28-35, Sep. 2014.

* cited by examiner

METHOD AND SYSTEM FOR OPTICAL FIBER SENSING

RELATED APPLICATIONS

This application is a National Phase of PCT Patent Application No. PCT/IL2019/051364 having International filing date of Dec. 12, 2019, which claims the benefit of priority under 35 USC § 119(e) of U.S. Provisional Patent Application No. 62/778,967 filed on Dec. 13, 2018. The contents of the above applications are all incorporated by reference as if fully set forth herein in their entirety.

FIELD AND BACKGROUND OF THE INVENTION

The present invention, in some embodiments thereof, relates to optical fiber sensing and, more particularly, but not exclusively, to a method and system for sensing properties along an optical fiber.

It is often desirable to monitor strain in a structure, such as a bridge or highway overpass, a building, or a component in a vehicle, in order to get advance warning of fracture or other failure of the structure. However, it is not always convenient (or even necessary) to monitor the strain as it is occurring, and it is sufficient to know merely the maximum strain the structure has experienced in a given timeframe. For example, for vehicles such as aircraft, weight, space and other limitations would preclude monitoring strain of components therein in real time, but for purposes of evaluating the likelihood of future failure, it would be sufficient to know the maximum strain the component in the vehicle experienced during a particular trip. Therefore, it would be convenient to have a means of sensing and maintaining for later measurement the maximum strain the component experienced.

Optical fiber sensors for measuring strain are known in the art, and have many advantages over other types of sensors. They are economical, durable, light-weight, and can be used in electromagnetically noisy environments, and are therefore ideal for use in aircraft. Heretofore, Rayleigh scattering has been used for monitoring the mechanical properties along the fiber in configuration known as optical time-domain reflectometry (OTDR) and its' various implementations [Koyamada, et al., Lightwave Tech. 27, 1142 (2009); Pan et al., in Optical Fiber Communication Conference, OSA Technical Digest (online) (Optical Society of America, 2014), paper Th2A.21; A. Champavere, in Optical Fiber Communication Conference, OSA Technical Digest (online) (Optical Society of America, 2014), paper W3D.1].

Another type of OTDR is known as Brillouin OTDR technique, which involves measurements based on Brillouin scattering. In an optical fiber, Brillouin scattering is an inelastic phenomenon that results from the interaction of incident optical photons (of an incident optical signal) with acoustic phonons in the medium (the optical fiber). This interaction induces a counter-propagating optical wave (reflected or backscattered optical signal) having a frequency (known as the Brillouin frequency) that is shifted from the frequency of the original incident optical wave. Brillouin scattering in an optical fiber is sensitive to both temperature and strain changes in the optical fiber.

European Publication No. EP0348235 discloses a method for evaluating properties of an optical fiber using Brillouin amplification. The technique uses a non-linear interaction between a first modulated signal light from a first light source and a second signal light from a second light source which counter propagate in an optical fiber, and analyzes the signal waveform of the second signal light which is influenced by Brillouin light amplification.

U.S. Published Application No. 20170115138 discloses an optical sensing technique in which an excitation optical signal is coupled into a first optical fiber to induce Rayleigh backscattering and provide a backscattered signal. The backscattered signal is coupled into a second optical fiber. The backscattered signal is optically amplified in the second optical fiber.

Additional background art includes Beugnot et al., "Distributed Brillouin sensing with submeter spatial resolution: modeling and processing", Optics Express, 19, 7381 (2011); Zhao et al., "On-line monitoring system of 110 kV submarine cable based on BOTDR", Sensors and Actuators A: Physical, 216, 28 (2014); and Minardo et al., "High-Spatial Resolution DPP-BOTDA by Real-Time Balanced Detection", IEEE Photonics Technology Letters, 26, 1251 (2014).

SUMMARY OF THE INVENTION

According to an aspect of some embodiments of the present invention there is provided a method of optical sensing. The method comprises: coupling an excitation optical signal into a first optical fiber to induce Rayleigh backscattering, thereby providing a backscattered signal; optically amplifying the backscattered signal in the first optical fiber, thereby providing an amplified backscattered signal; coupling the amplified backscattered signal into a second optical fiber, spatially separated from the first optical fiber; and optically re-amplifying the amplified backscattered signal in the second optical fiber, thereby generating a sensing signal.

According to some embodiments of the invention the optical amplification comprises introducing a pump light beam into the first fiber, wherein the pump light beam and the excitation optical signal enter the first fiber from the same end thereof.

According to some embodiments of the invention the optical re-amplification comprises introducing a pump light beam into the second fiber, wherein the pump light beam and the amplified backscattered signal enter the second fiber from opposite ends thereof.

According to some embodiments of the invention the optical re-amplification comprises introducing a pump light beam into the second fiber, wherein the pump light beam and the amplified backscattered signal enter the second fiber from the same end thereof.

According to some embodiments of the invention the invention the method comprises transmitting the sensing signal into a signal analyzer, for analyzing the sensing signal so as to identify a change in at least one property along the first fiber.

According to some embodiments of the invention the method comprises transmitting the sensing signal into a signal analyzer, for analyzing the sensing signal so as to identify a spatially-resolved change in at least one property along the first fiber.

According to some embodiments of the invention at least one of the optical amplification and the optical re-amplification comprises employing Brillouin amplification.

According to some embodiments of the invention at least one of the optical amplification and the optical re-amplification comprises employing Raman amplification.

According to some embodiments of the invention at least one of the optical amplification and the optical re-amplification is an on-resonance optical amplification.

According to some embodiments of the invention at least one of the optical amplification and the optical re-amplification is an off-resonance optical amplification.

According to an aspect of some embodiments of the present invention there is provided a system for optical sensing. The system comprises: a light source system configured for generating an excitation optical signal selected to induce Rayleigh backscattering, a first pump light beam and a second pump light beam; an arrangement of optical couplers arranged for coupling the excitation optical signal and the first pump light beam into a first optical fiber, to provide an amplified backscattered signal, and for coupling the amplified backscattered signal and the second pump light beam into a second optical fiber, spatially separated from the first optical fiber, to thereby generate an optically re-amplified sensing signal; and a signal analyzer, for analyzing the sensing signal so as to identify a change in at least one property along the first fiber.

According to some embodiments of the invention the first pump light beam and the excitation optical signal enter the first fiber from the same end thereof.

According to some embodiments of the invention the second pump light beam and the amplified backscattered signal enter the second fiber from the same end thereof.

According to some embodiments of the invention the second pump light beam and the amplified backscattered signal enter the second fiber from opposite ends thereof.

According to some embodiments of the invention the signal analyzer is configured for analyzing the sensing signal so as to allow identifying a spatially-resolved change in at least one property along the first fiber.

According to some embodiments of the invention the at least one property is a mechanical property.

According to some embodiments of the invention the mechanical property comprises strain.

According to some embodiments of the invention the mechanical property comprises pressure.

According to some embodiments of the invention the mechanical property comprises vibration.

According to some embodiments of the invention the vibration comprises acoustic vibration.

According to some embodiments of the invention the at least one property is a thermal property.

According to some embodiments of the invention the at least one property is a chemical property.

According to some embodiments of the invention at least one of the first and the second pump light beams is selected to amplify by Brillouin amplification.

According to some embodiments of the invention at least one of the first and the second pump light beams is selected to amplify by Raman amplification.

According to some embodiments of the invention the excitation optical signal is a pulsed optical signal.

According to some embodiments of the invention a characteristic duty cycle of the pulsed optical signal is less than 10%.

According to some embodiments of the invention at least one of the first and the second pump light beams is selected to induce an on-resonance optical amplification.

According to some embodiments of the invention at least one of the first and the second pump light beams is selected to induce an off-resonance optical amplification.

According to some embodiments of the invention a detuning frequency of the off-resonance optical amplification is from about 0.1× to about 0.9×, where × is a characteristic on-resonance bandwidth of the optical amplification.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 9A shows a wide strain regime, and FIG. 9B shows weak strain regime.

DETAILED DESCRIPTION OF SPECIFIC EMBODIMENTS OF THE INVENTION

Figure 1:
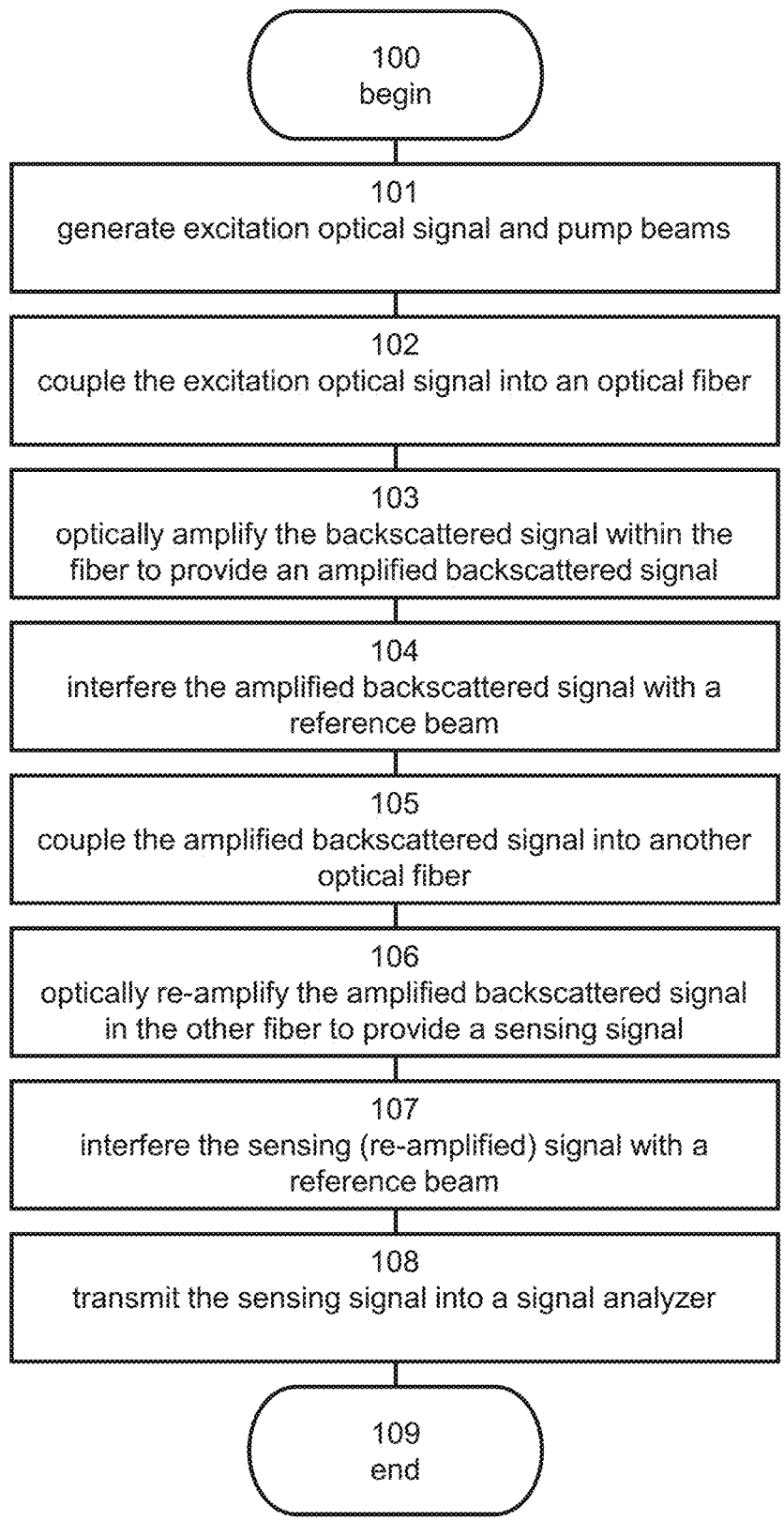
FIG. 1 is a flowchart diagram describing a method of optical sensing, according to some embodiments of the present invention.

The present invention, in some embodiments thereof, relates to optical fiber sensing and, more particularly, but not exclusively, to a method and system for sensing properties along an optical fiber.

Before explaining at least one embodiment of the invention in detail, it is to be understood that the invention is not necessarily limited in its application to the details of construction and/or the arrangement of the components and/or methods set forth in the following description and/or illustrated in the drawings and/or the Examples. The invention is capable of other embodiments or of being practiced or carried out in various ways.

Light propagating in a medium can undergo a variety of scattering events, both linear and non-linear. Three types of light scattering include Rayleigh scattering, Raman scattering and Brillouin scattering. In Rayleigh scattering, incident light is elastically scattered at the same wavelength. In Raman scattering, incident light is scattered by the vibrations of molecules or optical phonons and undergoes relatively large frequency shifts. In Brillouin scattering, incident light is scattered by acoustic vibrations (phonons) and undergoes relatively small frequency shifts.

Rayleigh, Raman, and Brillouin scatterings can be used in distributed optical waveguide sensors to measure a physical parameter such as temperature, strain, stress and pressure over the length of an optical fiber. Light is propagated in the optical fiber. Light scattering occurs within the waveguide, part of which is captured in the backward propagating modes of the waveguide and can be detected by a receiver. By monitoring one or more variations in the captured light the physical parameter can be determined.

It was realized by the present Inventors that traditional fiber optic sensors based on scattering have problems because scattering produces signals that are much weaker than the light that created them. The originating light produces a relatively small amount of scattered light, only a portion of which is captured.

While conceiving the present invention it has been hypothesized and while reducing the present invention to practice it has been realized that Rayleigh backscattered light can be amplified by optical amplification. The present Inventors found and experimentally proved that optical amplification can significantly flatten, or fully flatten or reverse the exponential decay of backscattered light. The present Inventors also found and experimentally proved that the signal-to-noise ratio (SNR) can be significantly enhanced by performing both internal and external optical amplifications.

Herein, "internal optical amplification" refers to optical amplification performed within a fiber in which backscattering, typically Rayleigh backscattering, occurs in response to excitation. Such a fiber is also referred to herein as a sensing fiber.

Herein, "external optical amplification" refers to optical amplification performed within a fiber that is spatially separated from the fiber in which the backscattering had occurred in response to the excitation.

The Inventors found that the power of the OTDR signal may vary along the sensing fiber, so that at some points along the fiber the SNR may be more enhanced compared to other points along the fiber. This is because the optimum value of the pump-Stokes detuning depends on the OTDR power, and so each the OTDR signal from each point along the sensing fiber requires a different value of pump detuning in order to achieve SNR enhancement. The combination of internal and external optical amplifications in accordance with preferred embodiments of the present invention is therefore advantageous because it ensures simultaneous SNR enhancement along the entire length of the sensing fiber.

The present Inventors have therefore devised a method and a system for optical sensing that utilize these discoveries.

The optical sensing of the present embodiments can be utilized to monitor strain in a structure, such as a bridge or highway overpass, a building, or a component in a vehicle, in order to get advance warning of fracture or other failure of the structure. In these embodiments, an optical fiber is placed along the structure and the technique of the present embodiments is employed to obtain a sensing signal and to determine the strain or changes in the strain based on the obtained sensing signal.

The optical sensing of the present embodiments can be utilized sensing of a wellbore, pipeline, or other conduit or tube so as to measure properties and conditions thereof. In these embodiments, an optical fiber is placed in the wellbore, pipeline, or other conduit or tube and the technique of the present embodiments is employed to obtain a sensing signal and to determine one or more properties. For example, formation properties that may be measured in downhole reservoirs comprise pressure, temperature, porosity, permeability, density, mineral content, electrical conductivity, and bed thickness. Fluid properties, such as pressure, temperature, density, viscosity, chemical elements, and the content of oil, water, and/or gas, may also be measured. In addition, downhole-logging tools based on sonic well logging systems may be used to measure downhole properties such as formation porosity, location of bed boundaries and fluid interfaces, well casing condition, and behind casing cement location and bonding quality-monitoring properties and conditions over time.

The optical sensing of the present embodiments can be utilized for sensing intrusion or sabotage detection. In these embodiments, an optical fiber is placed along a perimeter fence, or underground, or underwater, or along a pipeline or any other facility or structure and the technique of the present embodiments is employed to obtain a sensing signal, to determine whether there is an intrusion or a sabotage, and to alert responsively to such detection.

FIG. 1 is a flowchart diagram of the method according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 100 and optionally and preferably continues to 101 at which light is generated, preferably by a light source system, such as, but not limited to, a laser light source system. The generated light optionally and preferably includes an excitation optical signal and two or more pump light beams. The pump beams can be of the same or different optical characteristics. For example, the pump beams can split from a single beam, in which case they typically have the same optical characteristics. The pump beams can be generated by different light sources, in which case they can have different optical characteristics The central frequency of the spectrum of the excitation optical signal is denoted $f_e$, and the central frequency of the spectrum of each pump light beam is denoted $f_p$. The difference between $f_e$ and $f_p$, in absolute value, is denoted $\Delta f$.

The excitation optical signal can be at a frequency which is at a value that is exactly at, or close to (e.g., within several MHz from) the characteristic resonant Stokes frequency shift from the pump beam frequency. The characteristic resonant Stokes frequency shift of an optical fiber can be determined, for example, by prior measurement.

In some embodiments the excitation optical signal has a wavelength in the range of from about 0.3 micrometer to about 1.6 micrometer. In some embodiments the excitation optical signal is in the visible light spectrum (having a wavelength from about 0.75 micrometers to about 0.38 micrometers).

In some embodiments of the present invention the excitation optical signal is a pulsed optical signal. The duty cycle and pulse width of the pulses in the pulsed optical signal can be selected to reduce or prevent aliasing level and in accordance with the desired spatial accuracy of the optical sensing. The characteristic duty cycle of pulsed optical signal is preferably small, e.g., less than 10% or less than 5% or less than 2% or less than 1% or less than 0.5% or less than 0.2%, e.g., 0.1% or less. The characteristic pulse width of the pulsed optical signal can be from about 0.1 ns to about 100 ns or from about 1 ns to about 100 ns or from about 10 ns to about 100 ns or from about 10 ns to about 50 ns, e.g., about 20 ns.

One or both the pump light beams can be a CW beam. The central wavelength of the pump light beams can be selected to effect on-resonance optical amplification or, more preferably, an off-resonance optical amplification of the Stokes beam. As demonstrated in the Examples section that follows, off-resonance optical amplification provides a better SNR compared to on-resonance optical amplification. Nevertheless, some embodiments of the present invention contemplate on-resonance optical amplification. Preferably, the optical amplification comprises Brillouin amplification. Alternatively, the optical amplification comprises Raman amplification. In both cases, either the frequency $f_p$ of the pump light beam is selected based on $f_e$ or, equivalently, the frequency $f_e$ is selected based on $f_p$.

In some embodiments of the present invention the difference between $f_e$ and $f_p$ is the same or about the characteristic resonant Stokes frequency shift of the optical fiber, and is also based on the physical mechanism according to which optical amplification is employed.

The difference between the actual frequency shift $\Delta f$ and the resonant frequency shift value of the optical fiber for the amplification mechanism that is being activated (e.g., Brillouin scattering, Raman scattering), in absolute value, is referred to as a detuning frequency.

When an on-resonance optical amplification is employed, the detuning frequency is zero or close to zero (e.g., less than 0.1× or less than 0.05× or less than 0.01×, where × is the characteristic on-resonance bandwidth of the optical amplification).

When an off-resonance optical amplification is employed, the detuning frequency is optionally and preferably from about 0.1× to about 0.9×, where × is a characteristic on-resonance bandwidth of the optical amplification.

Preferably, the detuning frequency is less than 100 MHz, more preferably less than 80 MHz, more preferably less than 60 MHz, more preferably from about 3 MHz to about 60 MHz, or from about 3 MHz to about 50 MHz, or from about 3 MHz to about 40 MHz, or from about 3 MHz to about 30 MHz, or from about 3 MHz to about 20 MHz, or from about 3 MHz to about 15 MHz. These embodiments are particularly useful for Brillouin amplification. For Raman amplification the detuning frequency can be larger, for example, from about 1000 to about 10,000 larger than the aforementioned detuning frequencies.

In various exemplary embodiments of the invention both the excitation optical signal and the pump light beams are formed from the same light beam. While such configuration is preferred, embodiments in which the excitation optical signal and the pump light beam are formed by separate light sources are also contemplated. Use of a single light source is particularly useful for Brillouin amplification, and use of separate light sources is particularly useful for the Raman amplification.

For example, a CW light beam can be generated and split into two beams. One of these beams can be modulated to form the excitation optical signal, and the other beam can be further split into two pump light beams. Representative examples of such a procedure are provided below.

The method preferably continues to 102 at which an excitation optical signal is coupled into a first optical fiber to induce Rayleigh backscattering, thereby providing a backscattered signal. The coupling can be by an optical coupler, such as, but not limited to, an optical circulator. The first optical fiber is optionally and preferably a fiber at which changes in optical properties are to be monitored, and is therefore employed as a sensing fiber. The first optical fiber can be strung along or around the perimeter or is placed on or just beneath the ground of an area to be monitored for intrusion.

Optionally and preferably, the method proceeds to 103 at which the backscattered signal is optically amplified in the first optical fiber, thereby providing an amplified backscattered signal. Amplification 103 is an internal optical amplification since it occurs within the sensing fiber.

In some embodiments of the present invention method preferably continues to 104 at which the amplified backscattered signal is coherently interfered with a reference optical beam. The frequency of the reference beam is optionally and preferably downshifted. The downshifting can be by the characteristic resonant Stokes frequency shift (in a process known as "homodyne coherent detection"), or by an amount that is different from the characteristic resonant Stokes frequency shift (in a process known as "heterodyne detection"). The reference beam can be a CW signal or be temporally modulated.

The method preferably continues to 105 at which the amplified backscattered signal (or the signal formed by the coherent interference between the amplified backscattered signal and the reference beam) is coupled into a second optical fiber that is spatially separated from the first optical fiber. This can also be achieved by an optical coupler, such as, but not limited to, an optical circulator. Optionally and preferably the method proceeds to 106 at which the amplified backscattered signal is optically re-amplified in the second optical fiber, thereby providing a sensing signal. The sensing signal is indicative of the optical properties of the first fiber, because it is effected by a Rayleigh scattering that had occurred within the first fiber. Since the second optical fiber is spatially separated from the sensing fiber, the re-amplification 106 is an external optical amplification.

The optical amplification 103 and/or the optical re-amplification 106 are typically achieved by coupling a respective pump beam into the respective fiber. For example, optical amplification 103 can be achieved by coupling a first pump beam into the first fiber, and the optical re-amplification 106 can be achieved by coupling a second pump beam into the second fiber. Typically, but not necessarily, the first pump beam and the excitation optical signal is coupled into the first fiber from the same end of the fiber, so that the backscattered signal and the first pump beam propagate in opposite directions.

The second pump beam can be coupled into the second fiber either to establish propagation of both the amplified backscattered signal and the second pump beam in the same direction (by coupling both the amplified backscattered signal and the second pump beam to the same end of the second fiber), or to establish propagation of the amplified backscattered signal and the second pump beam in opposite directions (by coupling the amplified backscattered signal and the second pump beam to the opposite ends of the second fiber).

The advantage of executing both optical amplification 103 and optical re-amplification 106 is that it ensures simultaneous SNR enhancement along the entire length of the first fiber. The inventors found that the combination of amplification 103 with re-amplification 106 provides SNR enhancement at all points along the first fiber, without the need to select the pump-Stokes detuning level separately for each point along the fiber.

The present Inventors found that optical amplification, particularly, but not necessarily, optical amplification by means of stimulated Brillouin scattering, can flatten or, more preferably, reverse the characteristic exponential decay of the Rayleigh backscattered signal. The characteristic exponential decay of the Rayleigh backscattered signal can be formulated as $\exp[-2\alpha z]$, where $\alpha$ is a Rayleigh scattering coefficient characteristic to fiber and z is the distance from the point of entry of the excitation signal to the point along the first fiber at which the Rayleigh scattering occurs. The characteristic exponential decay of the Rayleigh backscattered signal relates to the power P of the excitation signal via the relation $P=\rho\langle z\rangle \exp[-2\alpha z]$ where $\rho\langle z\rangle$ is the z-dependent reflectivity of the first fiber. In the presence of optical amplification (e.g., Brillouin amplification), the characteristic exponential decay of the backscattered signal is $\exp[\langle gI-2\alpha\rangle z]$, where g the gain coefficient (e.g., the Brillouin gain coefficient) and I is the intensity of the first pump beam.

The present inventors found that by a judicious selection of power of the first pump beam, the effective coefficient of z in the argument of the characteristic exponential decay of the backscattered signal can be made zero, close to zero, or positive. This can be achieved by selecting the intensity I of the first pump light beam to satisfy the relation $gI \geq K+2\alpha$, where K is a predetermined variation rate which larger than $-0.01\ m^{-1}$, more preferably larger than $-0.001\ m^{-1}$, more preferably larger than $-0.0001\ m^{-1}$. In some embodiments of the present invention I is selected to satisfy the relation $gI \geq 2\alpha$, and in some embodiments I is selected to satisfy the relation $gI > 2\alpha$. The latter two embodiments correspond to a non-zero and positive argument of the characteristic exponential decay of the sensing signal, respectively.

In some embodiments of the present invention method preferably continues to 107 at which the sensing (re-amplified) signal is coherently interfered with a reference optical beam. The frequency of the reference beam is optionally and preferably downshifted. The downshifting can to effect homodyne coherent detection, or heterodyne detection, as further detailed hereinabove. The reference beam can be a CW signal or be temporally modulated. In embodiments in which 104 is executed, it is not necessary to execute 107, and in embodiments in which 107 is executed, it is not necessary to execute 104. Also contemplated, are embodiments in which none of operations 104 and 107 is executed, and embodiments in which both operations 104 and 107 are executed.

The method optionally and preferably continues to 108 at which the sensing signal (or the signal formed by the interference between the sensing signal and the reference beam) is transmitted into a signal analyzer. The signal analyzer can be of any type known in the art. The signal analyzer can comprise an analog signal processing circuit that processes the sensing signal, and optionally displays the signal, for example, on an oscilloscope. The signal analyzer can comprise an analog-to-digital circuit that converts the sensing signal into a digital signal. The signal analyzer can include a digital data processor that receives the digital signal and processes it digitally. The signal analyzer analyzes the sensing signal so as to identify a change in at least one property along the first fiber. In some embodiments of the present invention signal analyzer analyzes the sensing signal so as to identify a spatially-resolved change in at least one property along the first fiber.

A "spatially-resolved change" means that the signal analyzer analyzes identifies the change in the property as well as the approximate location along the fiber at which the change occurs.

The term "property" refers to any physical observable that imparts a change on the optical properties of the first fiber. Representative examples of such properties including, without limitation, a mechanical property (e.g., strain, pressure, vibration, acoustics, acceleration, rotation), a thermal property (e.g., temperature), and a chemical property (e.g., concentrations of a chemical species).

Signal analyzers capable for receiving a sensing optical signal identifying a change of such properties are known in the art and found, for example, in U.S. Pat. Nos. 7,772,541, 6,545,760 and U.S. Published Application No. 20120111104.

The method ends at 109.

In some embodiments, the difference, or shift, between the central optical frequency of the second pump beam and the central optical frequency of the amplified backscattered signal is selected to be substantially equal to a value which provides maximum optical re-amplification. Such a frequency difference is typically referred to as the resonant Brillouin frequency, and may vary from one optical fiber to another. However, common optical fibers have a nominal resonant Brillouin frequency value in the region of 11 GHz. In this situation, the second pump beam acts as a bandpass filter with gain, where the filter spectrum is centered symmetrically about the optical spectrum of the amplified backscattered signal. The bandpass filter defined by the Brillouin amplifier has a filter bandwidth determined by the physics of the Brillouin process in the second optical fiber as well as by the spectral bandwidth of the pump, as is known in the art.

In some other embodiments, the difference between the central optical frequency of the second pump and the central optical frequency of the amplified backscattered signal is selected to be less than or greater than the value of the resonant Brillouin frequency, such that the difference causes detuning from the resonant value. In such embodiments, the Brillouin amplifier acts as a bandpass filter with gain, where the filter spectrum is shifted from the center of the optical spectrum of the amplified backscattered radiation. The bandpass filter defined by the Brillouin amplifier has a filter bandwidth determined by the physics of the Brillouin process in the optical fiber, as well as by the spectral bandwidth of the pump, as is known in the art.

In certain embodiments, detuned amplification is advantageous over amplification at the resonant Brillouin frequency, because the upper spectral region (if the detuning value is greater than the resonant value) or lower spectral region (if the detuning value is less than the resonant value) of the amplified backscattered signal is re-amplified more than the central region of the amplified backscattered signal. Such differentiation leads to preferential amplification of the information-bearing portion (the AC portion) of the amplified backscattered signal relative to amplification of its DC portion. It was unexpectedly found by the present Inventors that this also leads to an improved signal to noise ratio (SNR) in the final output signal. Similarly, using the principle described above, it is possible in some embodiments to preferentially re-amplify both the upper and lower sideband of the amplified backscattered radiation as compared to the amplification of central region, if the pump spectrum consists of the proper spectral profile to simultaneously preferentially re-amplify both sidebands with respect to the central portion of the Rayleigh spectrum.

The discussion above relates to Brillouin amplification for implementing an embodiment of the teachings herein. Embodiments of the teachings herein are implemented using other types of optical amplification. For example, in some embodiments, Raman amplification is used for implementing the teachings herein; such embodiments are substantially the same as discussed above, with appropriate changes in the values of the parameters discussed above.

FIGS. 2A-F are schematic illustrations of a system 200 for optical sensing, according to some embodiments of the present invention. System 200 can be used for executing method 100 as delineated above. System 200 comprises a light source system 202 configured for generating an excitation optical signal 204 selected to induce Rayleigh backscattering, a first pump light beam 206, and a second pump light beams 207, where both beams 206 and 207 are optionally and preferably selected to amplify Rayleigh backscattering. System 200 optionally and preferably additional comprises an arrangement of optical couplers 208 arranged for coupling excitation optical signal 204 and first pump beam 206 into a first optical fiber 210. In the illustration shown in FIGS. 2A-F, signals 204 and 206 are combined by an optical combiner 220 prior to their entry into coupler 208, but this need not necessarily be the case since other optical configurations can be employed to couple excitation optical signal 204 and first pump light beam 206 into optical fiber 210.

Figure 2A:
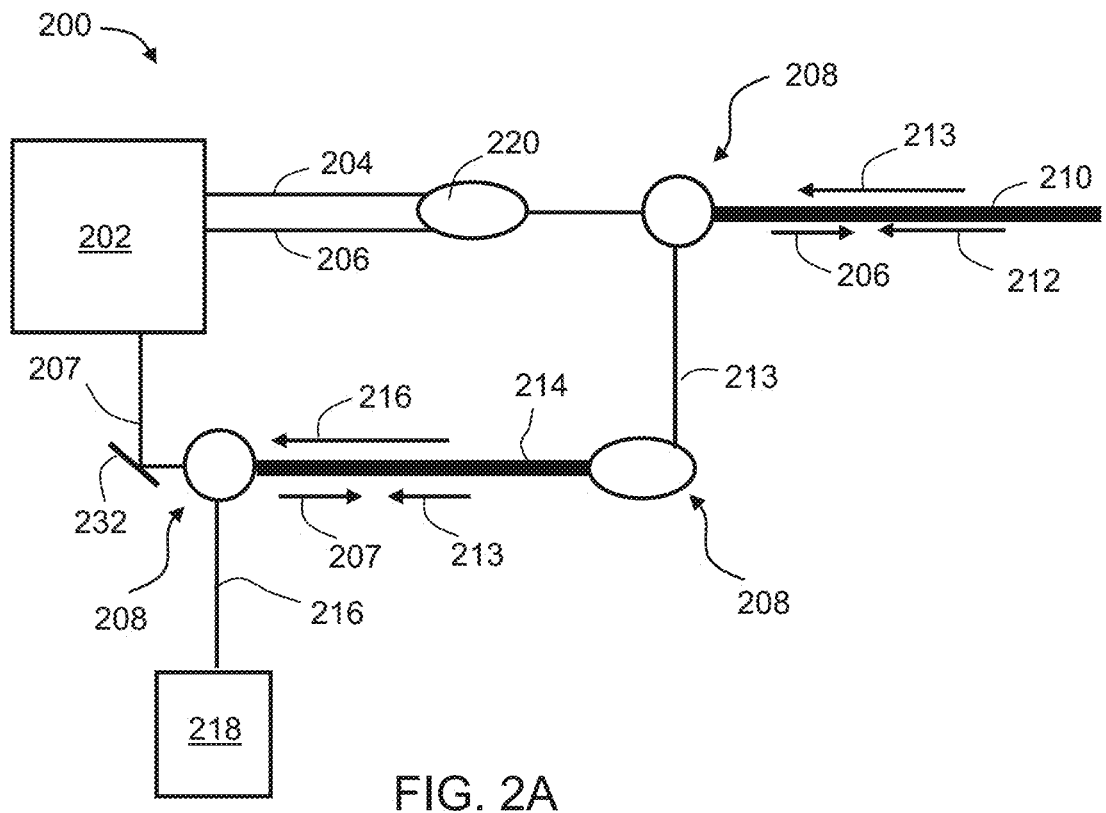
FIGS. 2A-F are schematic illustrations of a system for optical sensing, according to some embodiments of the present invention.
Figure 2B:
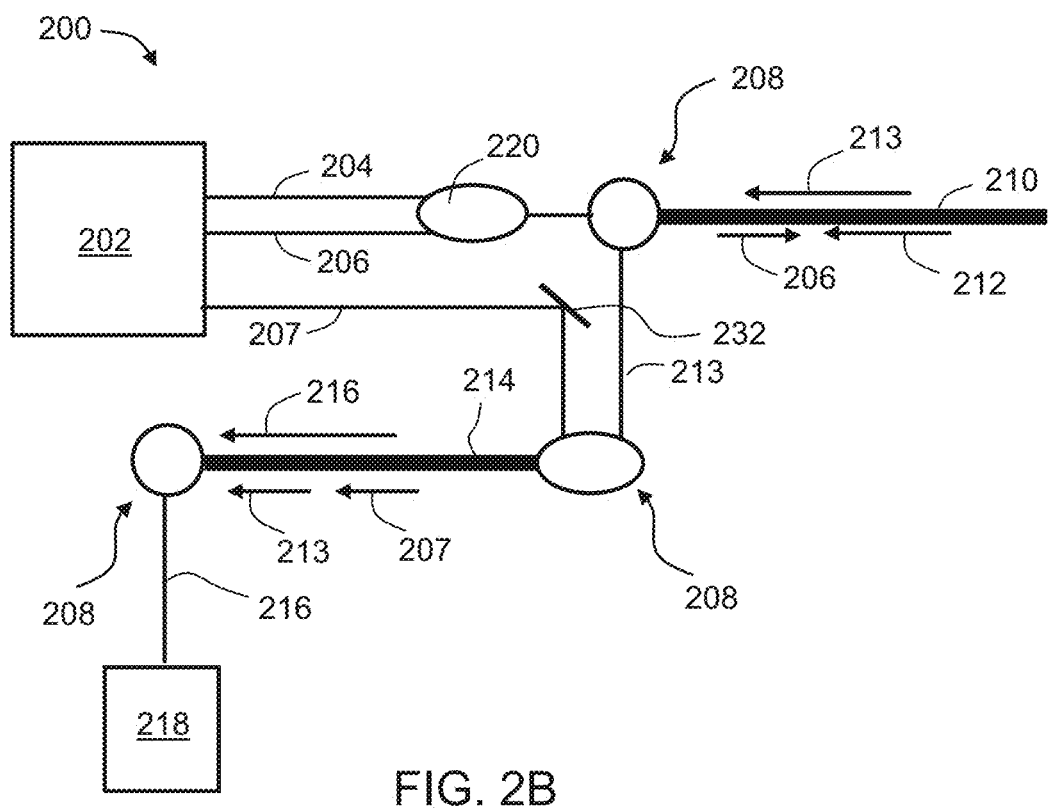
Figure 2C:
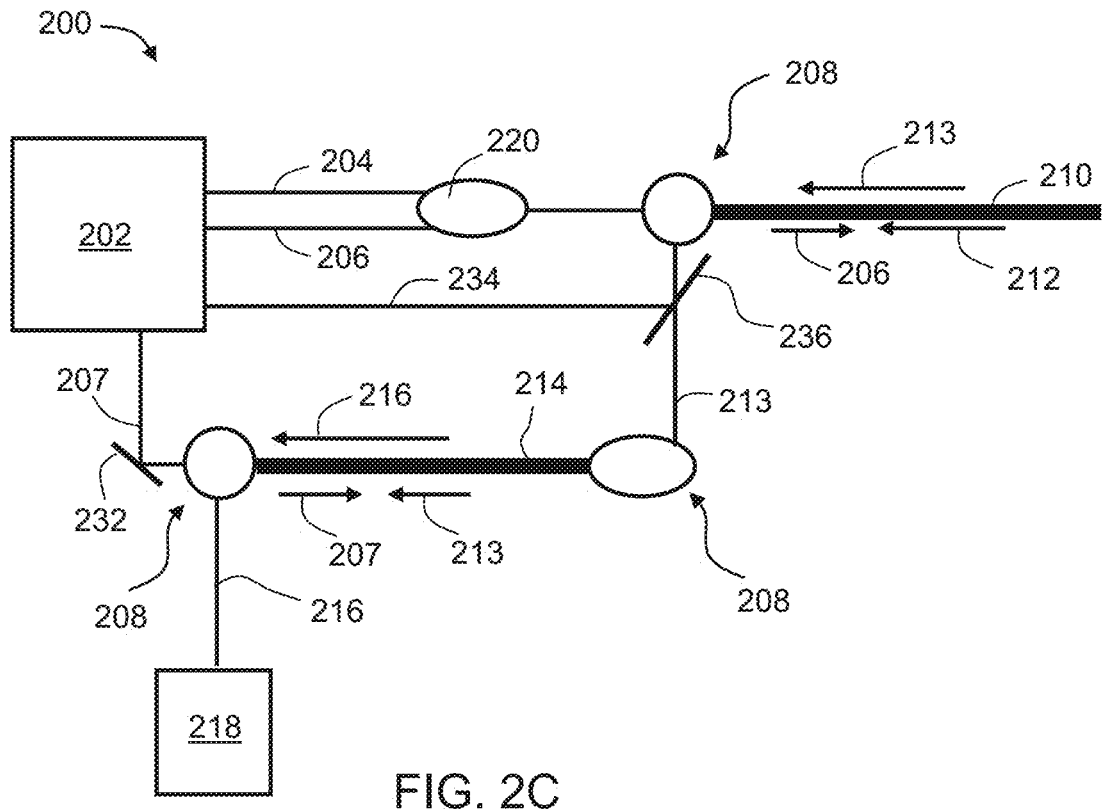
Figure 2D:
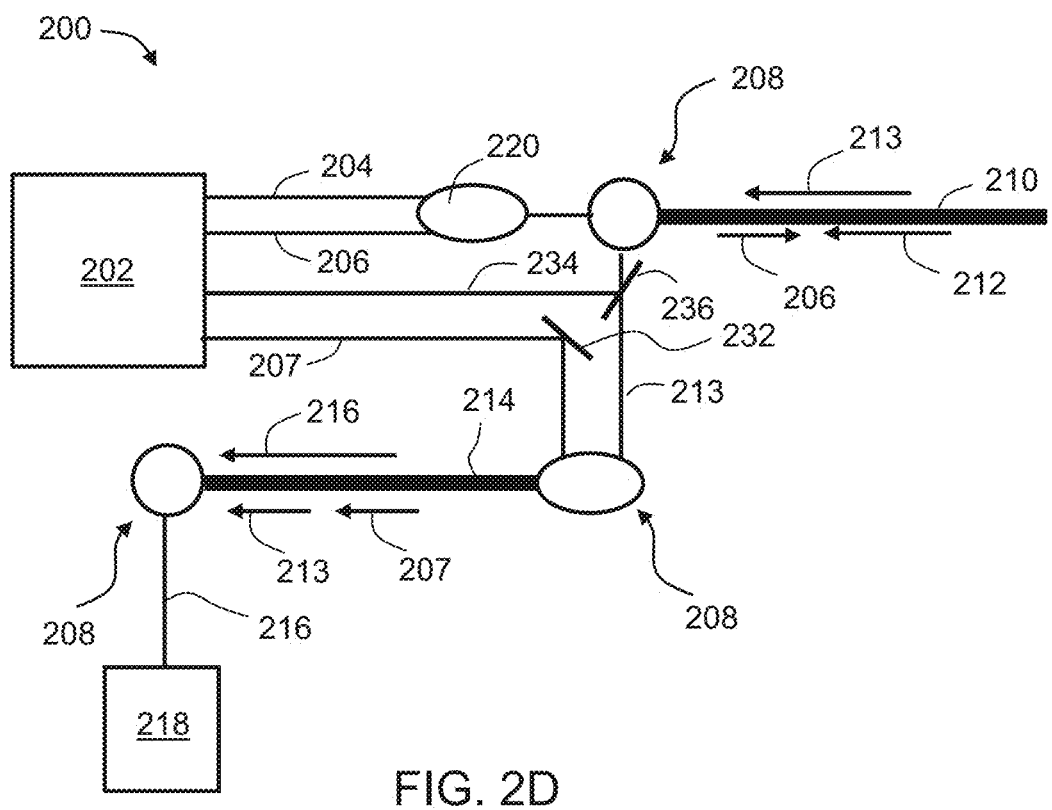
Figure 2E:
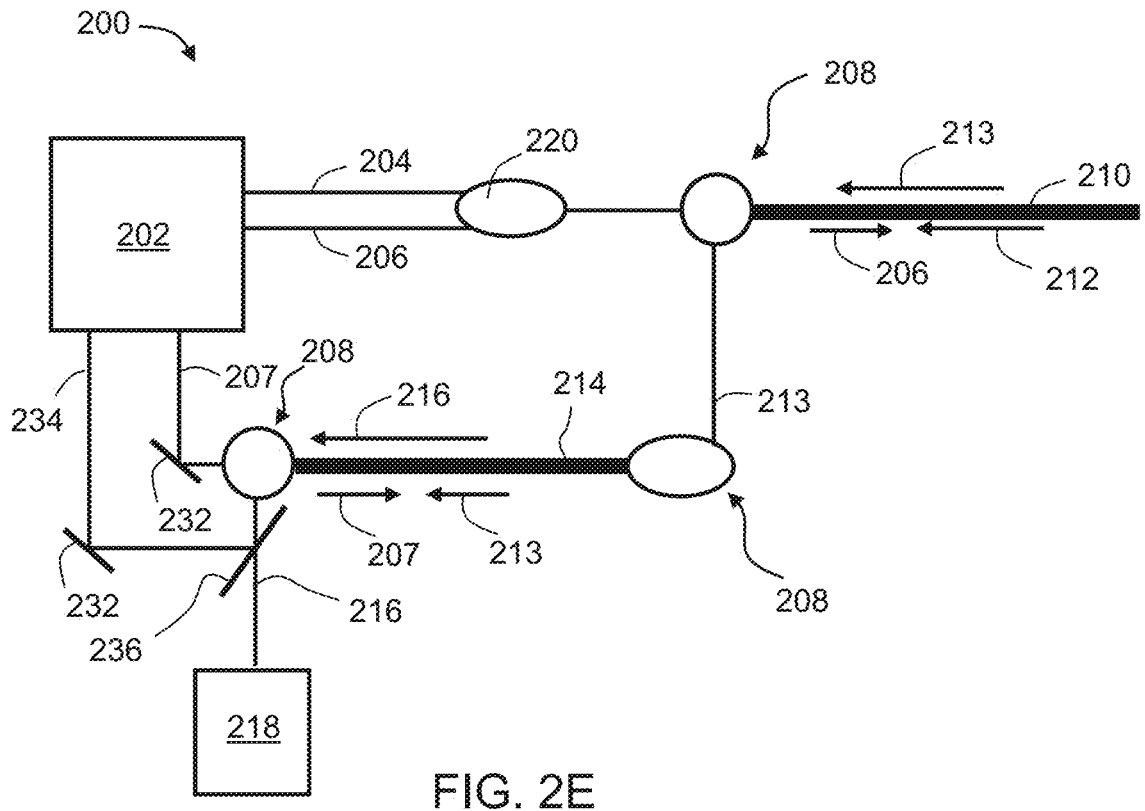
Figure 2F:
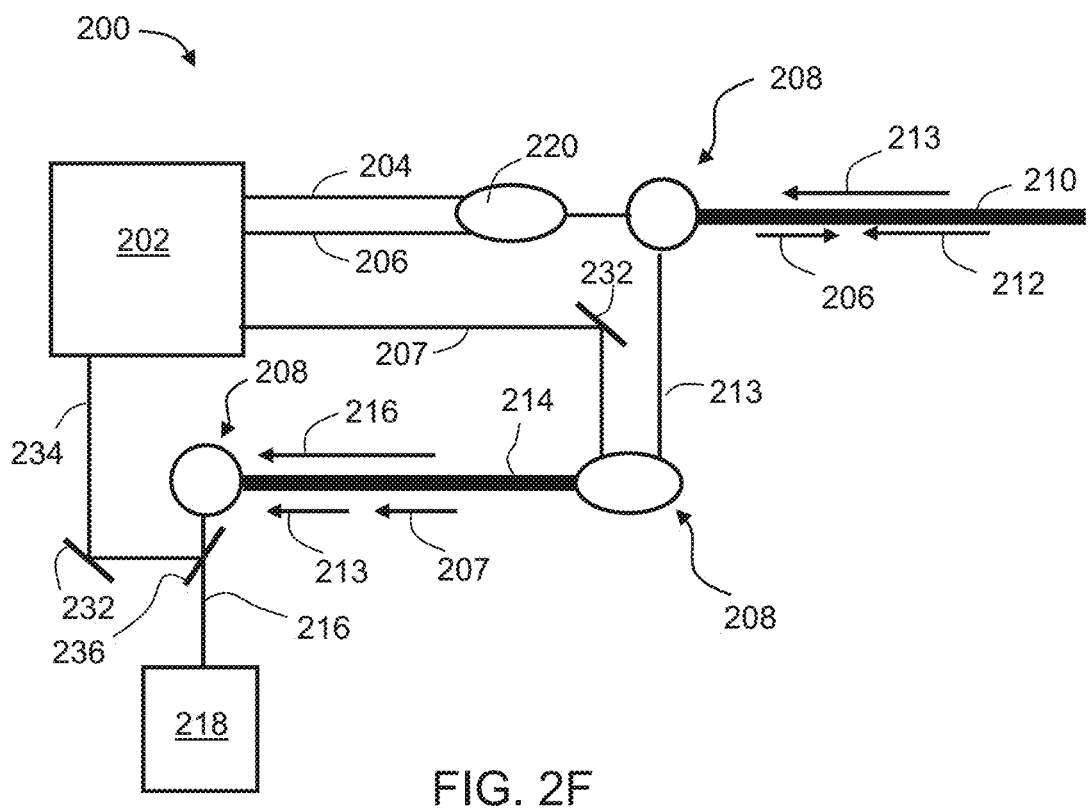

Excitation optical signal 204 induce Rayleigh backscattering so that a Rayleigh backscattered signal 212 is formed in fiber 210. First pump beam 206 optically amplifies the backscattered signal 212. The amplified backscattered signal is referred to herein as signal 213. It is appreciated that the signal shown at 213 within fiber 210 in FIGS. 2A-F is formed by means of the nonlinear interaction between signals 212 and 206 within fiber 210. Couplers 208 are also arranged for coupling the amplified backscattered signal 213 and the second pump light beam 207 into a second optical fiber 214, spatially separated from first optical fiber 210. FIGS. 2A, 2C and 2E illustrate embodiments in which signals 213 and 207 are coupled to opposite ends of fiber 214 to propagate therein in opposite directions, and FIGS. 2B, 2D and 2F illustrate embodiments in which signals 213 and 207 are coupled to the same end of fiber 214 to propagate therein in the same direction. Pump light beam 207 is illustrated as propagating in free space and being redirected to optical couplers 208 by means of one or more reflectors (e.g., mirrors) 232, but any other means (e.g., optical fibers, waveguides, etc.) for guiding pump light beam 207 from light source system 202 to ensure its in-coupling into fiber 214 are also contemplated.

The second pump light beam 207 re-amplifies signal 213. The re-amplified backscattered signal is referred to herein as sensing signal 216. It is appreciated that signal shown at 216 within fiber 214 in in FIGS. 2A and 2B is formed by means of the nonlinear interaction between signals 213 and 207 within fiber 214.

The present embodiments also contemplate configuration in which the amplified backscattered signal 213 and/or the re-amplified backscattered signal 216 are coherently interfered with a reference optical beam 234. These embodiments are illustrated in FIGS. 2C-F. Reference optical beam 234 can be provided by light source system 202. The frequency of reference beam 234 is optionally and preferably downshifted. The downshifting can be selected to provide homodyne coherent detection or heterodyne detection, as further detailed hereinabove. Reference beam 234 can be a CW signal or be temporally modulated.

The advantage of the embodiments illustrated in FIGS. 2C-F is that the coherent interference between reference beam 234, and the amplified 213 and/or re-amplified 216 backscattered signal further amplifies the respective backscattered signal (213 and/or 216) in a coherent way and preserves the optical phase information on the respective backscattered signal.

Coherent interference between reference beam 234 and the respective backscattered signal is typically effected in free space, e.g., using a beam combiner 236 such as a beam splitter or the like. Alternatively, it can be effected in a wave guide or optical fiber (e.g., optical fiber 214). FIGS. 2C and 2D illustrate embodiments in which reference beam 234 is coherently interfered with amplified backscattered signal 213. In these embodiments, beam combiner 236 is positioned on the optical path of signal 213 after signal 213 exits fiber 210, and reference beam 234 is directed to beam combiner 236 to interfere with signal 213 thereat. FIGS. 2E and 2F illustrate embodiments in which reference beam 234 is coherently interfered with re-amplified backscattered signal 216. In these embodiments, beam combiner 236 is positioned on the optical path of signal 216 after signal 216 exits fiber 214, and reference beam 234 is directed to beam combiner 236 to interfere with signal 216 thereat.

Also contemplated are configurations (not shown) in which reference beam 234 is coupled into fiber 214 so that the coherent interference with signal 216 occurs within fiber 214. Coupling of reference beam 234 into fiber 214 can be by means of couplers 208 from any of the two ends of fiber 214, similarly to the coupling of pump beam 207 thereto.

Reference beam 234 can be directed to the respective beam combiner 236 by means of reflectors 232, or by other means, such as, but not limited to, e.g., optical fibers, waveguides, etc.

In various exemplary embodiments of the invention system 200 comprises a signal analyzer 218 that receives sensing signal 216, and analyzes it so as to identify a change in at least one property along first fiber 210.

Various embodiments of the present invention as delineated hereinabove are further detailed below.

In some embodiments optical amplification is employed to at least a portion of the spectrum of Rayleigh-scattered radiation. Some embodiments comprise a method and system for detecting a change in the optical properties of a segment of a fiber using optical amplification, such as Brillouin amplification or Raman amplification, of at least a portion of the spectrum of Rayleigh-scattered radiation. In some embodiments, the method and system detect a change in the optical properties of a segment of a fiber using Raman amplification of Rayleigh-scattered radiation. Some embodiments relate to the field of intrusion detection. Some embodiments comprise a method and system for intrusion detection using detection of a change in Rayleigh scattering of radiation transmitted through a fiber to be monitored, where at least a portion of the spectrum of the Rayleigh-scattered radiation is optically amplified before detection using Brillouin amplification, Raman amplification, or any other suitable optical amplification.

In some embodiments of the invention, the method compares the sensing signal radiation at two or more points in time to identify a change in the Rayleigh backscattered radiation. The method uses the identified change to detect a change in the optical properties of a segment within the fiber and thereby to identify a segment of the fiber in which the change in optical properties occurred.

In some embodiments, the change is at least one member of the group consisting of stress in the segment, strain in the segment, temperature of the segment, and combinations thereof.

In some embodiments, the optical amplifier comprises a Brillouin amplifier. In some embodiments, the optical amplifier comprises a Raman amplifier.

In some embodiments, the detected change in the optical properties of the segment of the fiber is indicative of an interference with the fiber, such as physical contact with the fiber or unusual vibration of the fiber, in the identified segment. In some such embodiments, in which the fiber surrounds the perimeter of an area, such interference may be indicative of an intrusion into the area at the identified segment of the perimeter.

For example, in some embodiments change in the optical properties is detected for purposes other than intrusion detection, for example, monitoring of mechanical and structural integrity (e.g., in mechanical components such as propellers, rotors and wings, and structural elements such as fuselages, beams, pillars and supports) or for example, vibration monitoring (e.g., due to earthquakes, explosions, rotating mechanical elements).

In some embodiments, the detected change in the optical properties of the segment of the fiber is indicative of a loss of structural integrity, excessive deformation or excessive vibration (e.g., as in the case of the First Tacoma Narrows bridge) of the fiber that is in physical contact therewith. In embodiments in which the fiber is in contact with an object such as a mechanical element (e.g., a rotor, propeller, vane or wing) or structural element (fuselage, beam, pillar, support, spar, girder, cable, truss), such change may be indicative of potential or imminent mechanical failure of the object.

In some embodiments, the detected change in the optical properties of the segment within the object is indicative of an unusual vibration. In embodiments in which the fiber is in contact with a component of a vibration detector, such change may be indicative of noteworthy seismic or explosive activity.

In some embodiments the detected signal is used to monitor temperature along the segments of the fiber.

The segment of the fiber in which a detected change in the optical properties occurred is identified using any suitable method and/or device. In some embodiments, the segment of the fiber in which the change in the optical properties occurred is identified using a method and/or device known in the art, in some embodiments OTDR.

The segment of the fiber may be of any suitable length. In some embodiments, the segment of the fiber comprises a segment having a length of one or more meters, for example, at least 1 meter, at least 3 meters, at least 5 meters, at least 10 meters, at least 15 meter, at least 20 meters, at least 50 meters, at least 100 meters or more. In some embodiments, the segment of the fiber comprises a segment having a length of several kilometers, for example, at least 1 kilometer, at least 2 kilometers, at least 5 kilometers, at least 8 kilometers, at least 10 kilometers, or more.

In some embodiments, the segment comprises a segment having a length of at most 2 meters. In some embodiments, the segment has a length of at most 1.5 meters, at most 1 meter, at most 0.5 meters or even less.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

OTDR and its various implementations, such as cooperative and hybrid processes involving Brillouin and Rayleigh scattering, have been utilized for various applications in fiber-optic sensing. In addition, Brillouin amplification (BA), depletion, and dynamic gratings have of themselves emerged as important mechanisms for RF-photonic processing and sensing.

Brillouin amplification and signal processing of Rayleigh scattering (BARS) is suitable for processing the information in the Rayleigh-scattered signal. This Example, focuses on the use of external BARS (eBARS) to amplify and process the OTDR signal that is due to vibration induced strain on the fiber. It is shown that with optimum detuning between the pump and Stokes light, significantly enhanced signal-to-noise ratio (SNR) of the OTDR signal is achieved, as compared to amplification with an erbium-doped fiber amplifier (EDFA) or even on-resonance eBARS.

Figure 3:
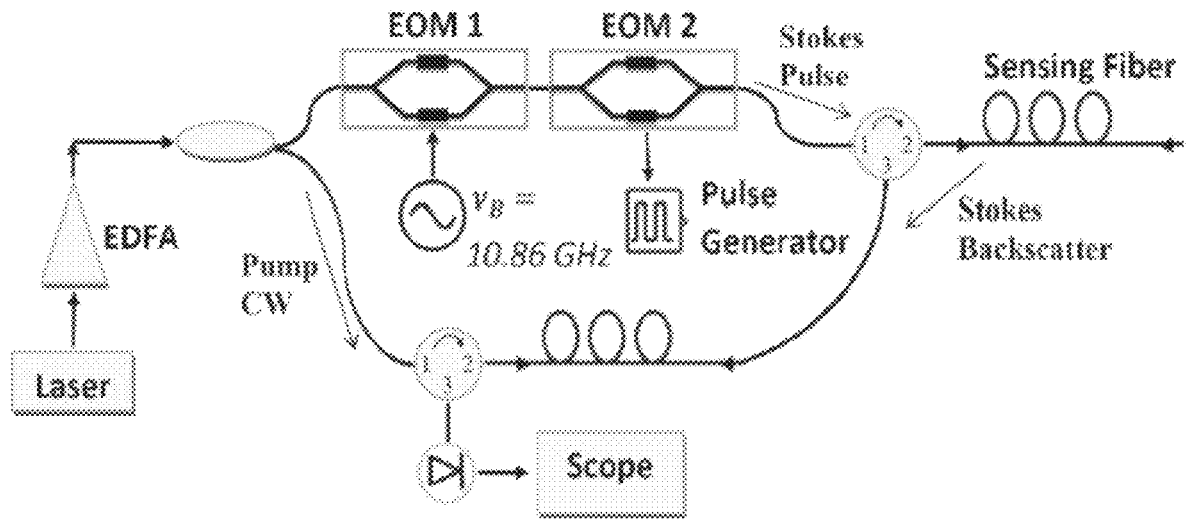
FIG. 3 shows experimental configuration for external Brillouin amplification and signal processing of Rayleigh scattering (BARS). The experimental configuration was used in experiments performed according to some embodiments of the present invention.

The experimental configuration of eBARS is shown in FIG. 3. The source was a 40 mW continuous-wave (CW) laser at 1550 nm, amplified with an EDFA to approximately 120 mW (two different types of lasers were used as detailed below). The output of the EDFA was split into two channels. In the upper channel, the light was first downshifted to the Stokes frequency by carrier-suppressed modulation in the region of 10.86 GHz with a Mach-Zehnder modulator (EOM1), and was then modulated with EOM2 to form a pulse train with a width of 20 ns and duty cycle of 0.1%, before entering a 2 km sensing fiber.

In the lower channel, the CW light entered a 6 km SMF28 fiber to act as a pump for BA. In some embodiments of the present invention the 6 km amplifier fiber can be replaced with a short fiber having high BA gain.

The resonant Brillouin offset of the second fiber was measured to be 10.86 GHz. The Stokes beam underwent Rayleigh backscattering from the sensing fiber, and this backscattered OTDR signal was then directed into the lower fiber, together with the counter-propagating pump to be amplified through BA before detection.

By detuning the eBARS system from the Brillouin amplifier's resonance condition, the SNR of the OTDR signal can be improved. This effect is attributed to a reduction in the DC level of the OTDR signal, since the single-sideband detuning selectively amplifies the AC signal content of the OTDR vibration signal. This Example demonstrates another mechanism that additionally contributes to this enhancement: the dependence of the BA bandwidth on the Stokes power.

Following is a detailed description of this effect in BA.

Figure 4:
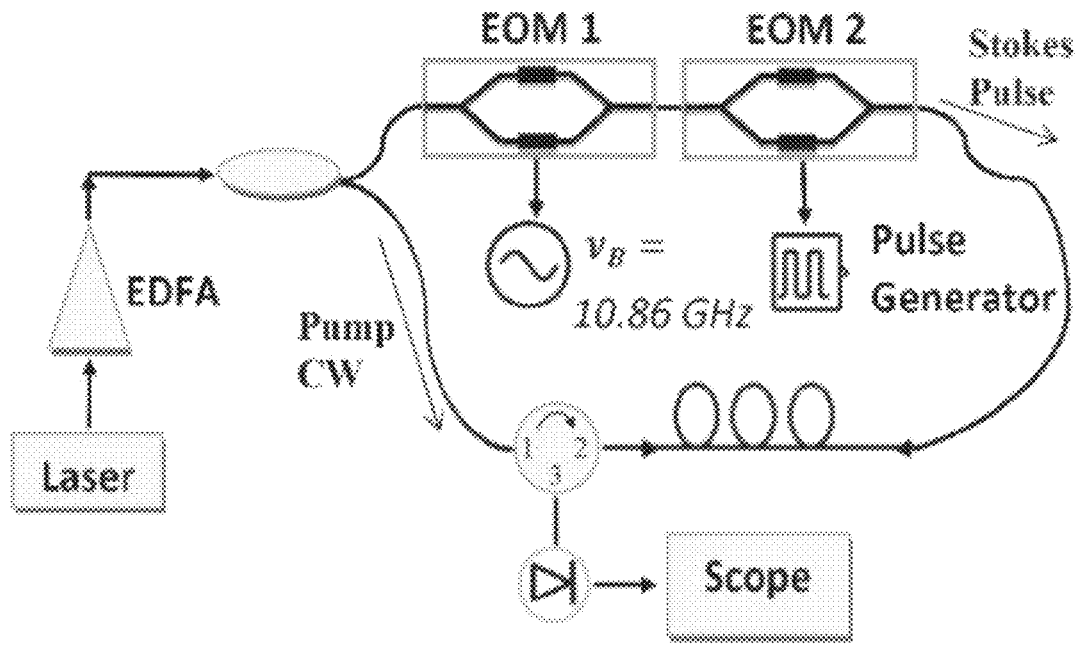
FIG. 4 shows Experimental configuration for bandwidth dependence on the Stokes-to-pump power ratio, Q, used in experiments performed according to some embodiments of the present invention.

The spectral bandwidth of BA is dependent on the pump power. The present Inventors observed that it is also dependent on Stokes power. For increasing values of Stokes-to-pump power ratio (denoted as Q), the bandwidth increases nonlinearly. This was measured in accordance with some embodiments of the present invention with the experimental system shown in FIG. 4, which allows for control over the Stokes power entering the BA but, for consistency, maintains most of the components of eBARS. The theoretical prediction for the output power's bandwidth versus Q, is based on a model that assumes monochromatic light (which is typical when the laser linewidth is significantly narrower than the Brillouin bandwidth) and CW (steady-state) operation. The model assumes pump depletion, where the output Stokes power is dependent not only on the gain factor, but also on Q:

$$Q = \frac{I_s(L)}{I_p(0)} = \frac{\frac{I_s(0)}{I_p(0)}\left[1 - \frac{I_s(0)}{I_p(0)}\right]}{\exp\left\{G\left[1 - \frac{I_s(0)}{I_p(0)}\right]\right\} - \frac{I_s(0)}{I_p(0)}}, \quad \text{(EQ. 1)}$$

In EQ. 1, $I_s$ and $I_p$ are the Stokes and pump intensities, respectively. At z=0, the amplified Stokes signal is measured, and the counter-propagating pump is injected and, at z=L, the Stokes is injected. The output amplification bandwidth is due to the gain G dependence on the detuning of the input signal's frequency from BA's resonance frequency:

$$G = Lg_0 \frac{\left(\frac{\Gamma_B}{2}\right)^2}{(\Omega_B - \Omega)^2 + \left(\frac{\Gamma_B}{2}\right)^2}, \quad \text{(EQ. 2)}$$

where $\Omega_B$ is the BA resonance frequency, $\Omega$ is the carrier frequency of the input Stokes signal, go is the line center gain factor, $\Gamma_B$ is the Brillouin bandwidth, and L is the fiber length of the amplifier.

Figure 5:
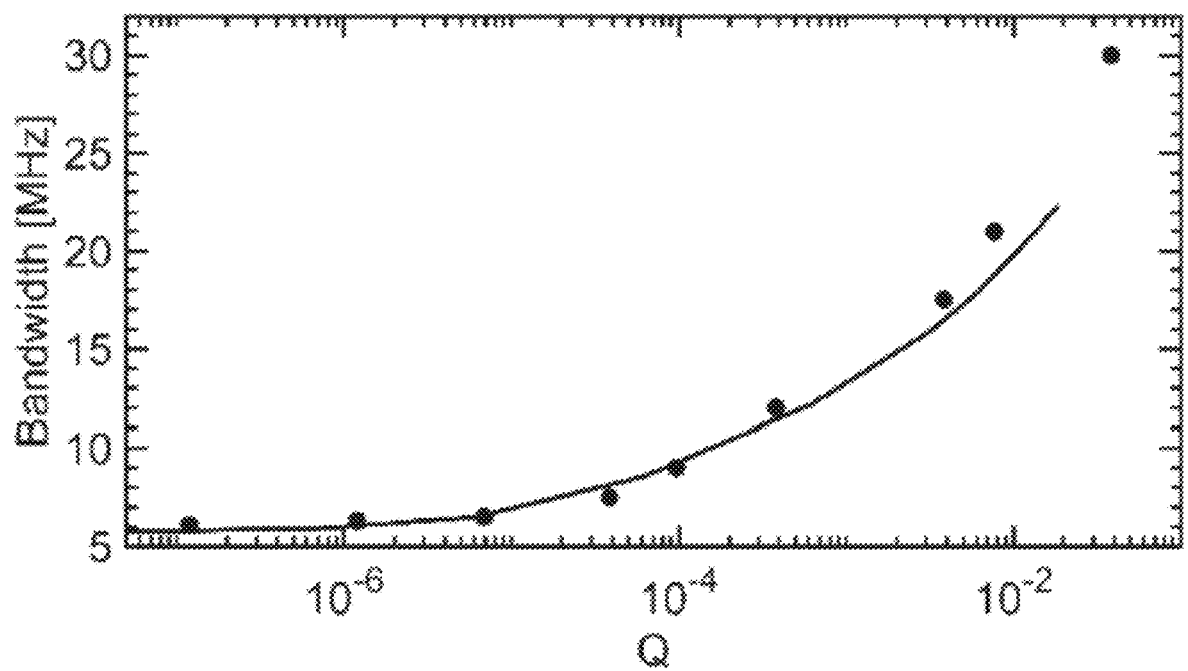
FIG. 5 shows output signal bandwidth versus Q, obtained in experiments performed according to some embodiments of the present invention. The solid line shows the theory and the dots show experimental results.

In an experiment, the present Inventors measured the bandwidth over a range of Q (pump power constant and varying Stokes) and plotted the results, together with the theoretical prediction in FIG. 5, showing good agreement. The measurements were obtained with an average of 30-40 samples to eliminate polarization dependent gain. With 10-sample averaging, the standard deviation of the SNR was about 10% of the mean due to polarization fluctuation. This allows the use of this effect for the eBARS sensor. By taking the resulting output power curves for two Q values and designating the higher value as $Q_s$ and the lower value as $Q_n$, an SNR expression can be obtained:

$$SNR = \frac{P_{out}(Q_s)}{P_{noise}(Q_n)}. \quad \text{(EQ. 3)}$$

Figure 6:
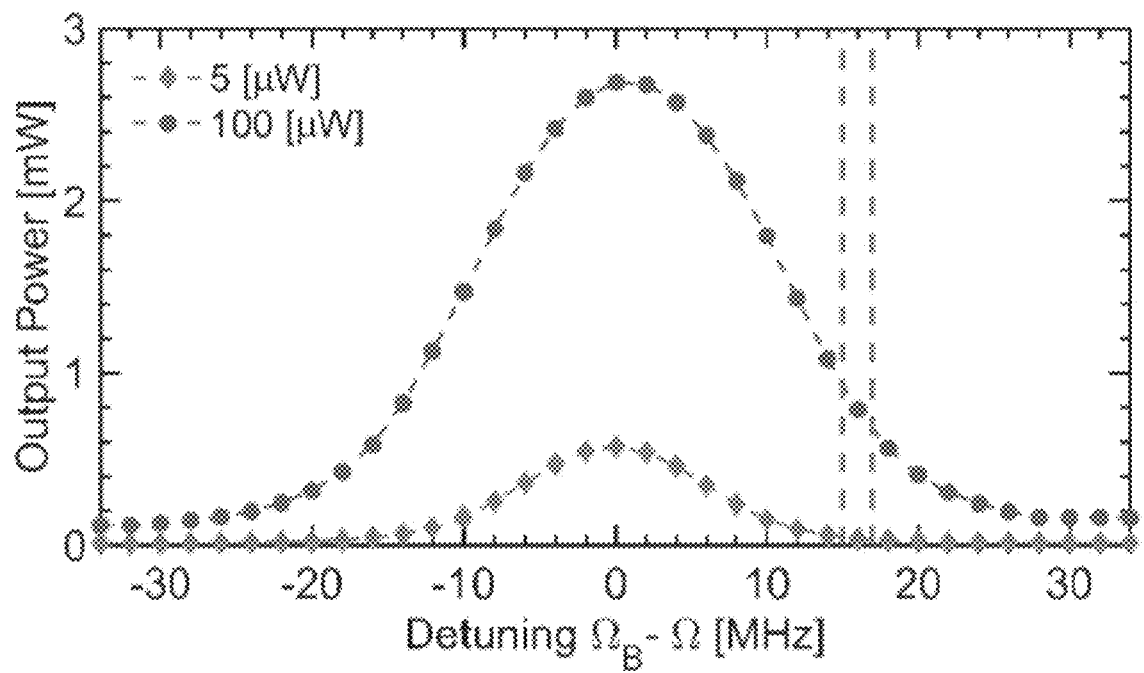
FIG. 6 shows experimental results of Stokes output versus detuning for two values of input Stokes power, as obtained in experiments performed according to some embodiments of the present invention. The optimal detuning regime for SNR enhancement is marked by dashed vertical lines. The dashed curves are an aid to the viewer in this and the following graphs.
Figure 7:
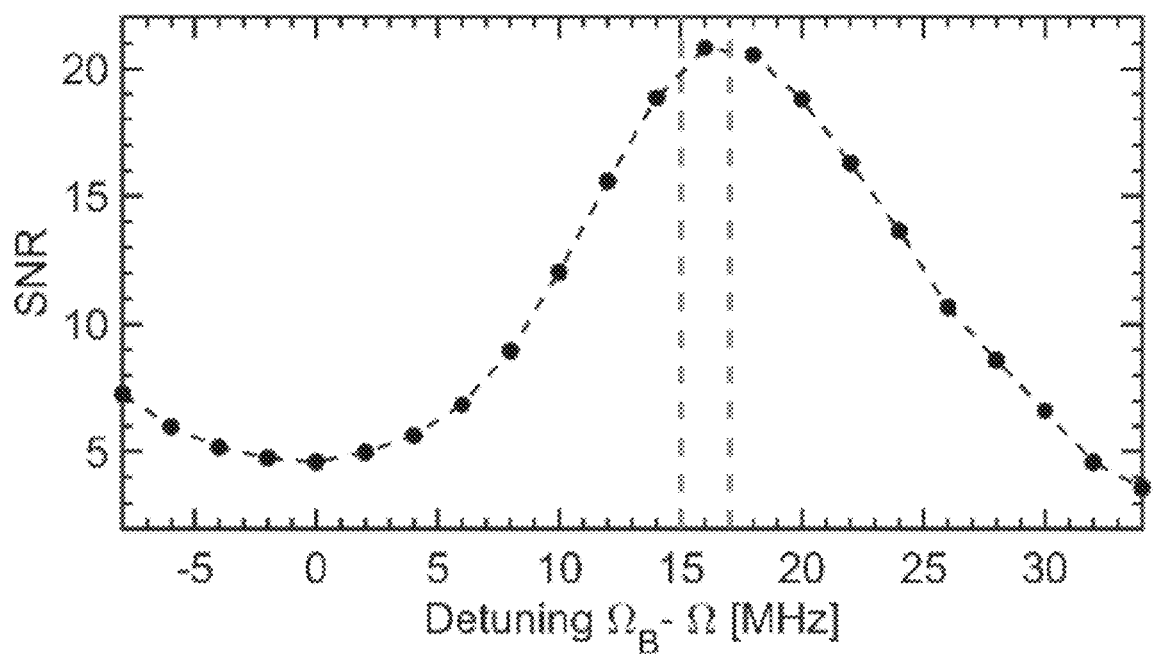
FIG. 7 shows experimental SNR versus detuning, as obtained in experiments performed according to some embodiments of the present invention. The dashed vertical lines indicate the region in which optimal SNR was achieved.

For example, FIG. 6 displays the amplification bandwidth for two values of the input Stokes, where the signal and noise levels are 100 and 5 µW, respectively. The dashed vertical lines indicate the region in which an optimal SNR is achieved. FIG. 7 shows the SNR achieved. The SNR is maximized within the detuning region indicated by the vertical lines. For zero detuning, the SNR is about 4.6 while, for optimum detuning, it is about 20.7.

Figure 8:
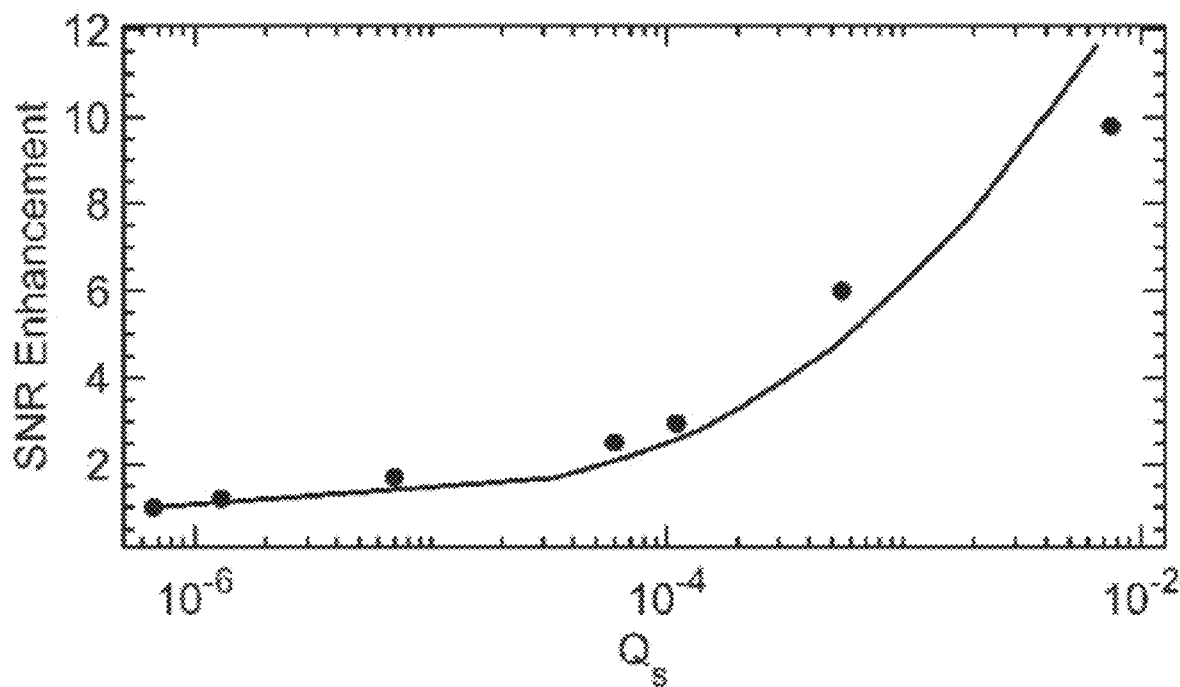
FIG. 8 shows SNR enhancement versus Q for an optimally detuned external BARS, as obtained in experiments performed according to some embodiments of the present invention. The solid line shows the theory and the dots show experimental results.

From EQ. 1, the SNR enhancement for increasing $Q_s$ relative to a constant $Q_n$ was plotted (FIG. 8). Relative to on-resonance eBARS, the SNR enhancement increases for increasing values of $Q_s$ in the optimally detuned eBARS sensor.

In accordance with some embodiments of the present invention this effect can be utilized for SNR enhancement of an off-resonant eBARS-based OTDR, as will be explained below. Without loss of generality, the following is for applications involving vibration and strain monitoring, but the principles can be applied to any application described herein.

Using the same experimental configuration and optical powers, these results were compared to two other amplifiers: (1) a resonant eBARS amplifier, and (2) a standard EDFA amplifier replacing the Brillouin amplifier. A sinusoidal strain at 3 kHz was applied to a fiber by a piezoelectric crystal (Optiphase PZ1) in the central portion of a 2 km long fiber, and the amount of strain was controlled by the pk-pk voltage on the crystal.

Figure 9A:
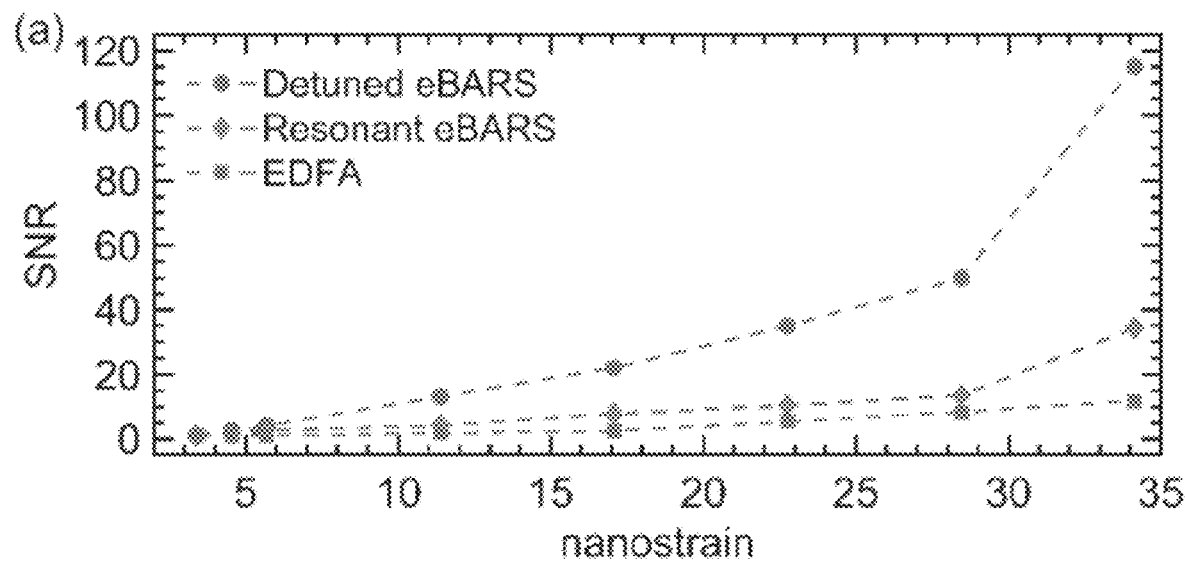
FIGS. 9A and 9B show experimental SNR versus strain for the three types of amplifiers obtained in experiments performed according to some embodiments of the present invention, where
Figure 9B:
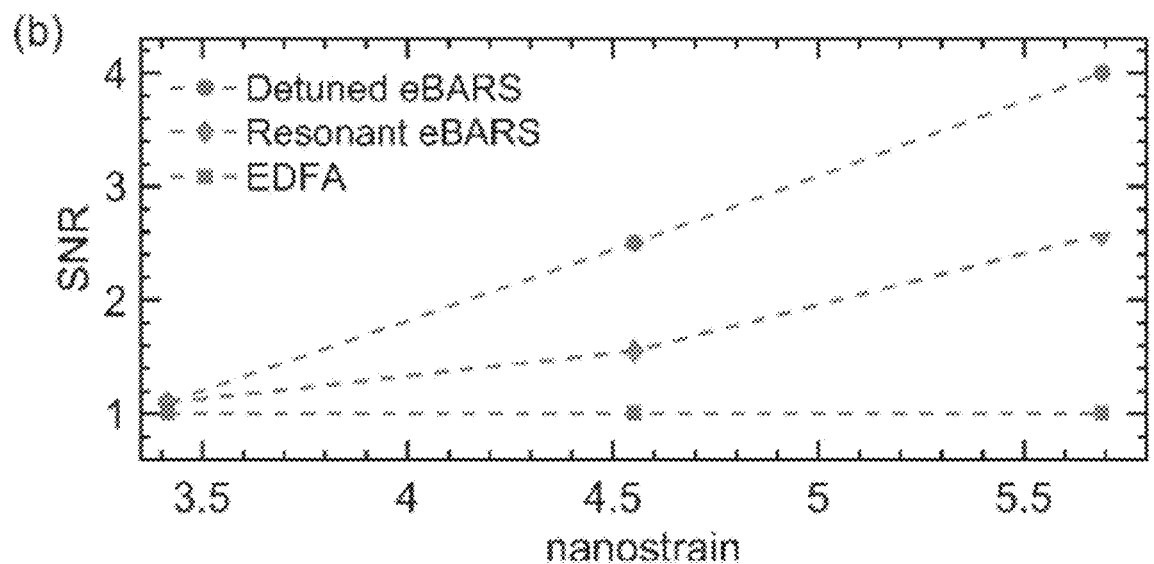

FIGS. 9A and 9B show the SNR using the three different amplifiers where, in the case of the EDFA, the amplifier output was further filtered using a 0.4 nm bandwidth Bragg filter. FIG. 9A plots the region from 3 to 35 nanostrain, and FIG. 9B zooms in on the weak 3-6 nanostrain region. As the strain increases, so does the difference between the SNR of off-resonant eBARS and resonant eBARS while, in every case, the EDFA configuration lags behind.

In the weak nanostrain regime (FIG. 9B), the clear superiority of the off-resonant eBARS amplifier of the present embodiments is demonstrate in terms of sensitivity as compared to the other amplifiers.

Figure 10:
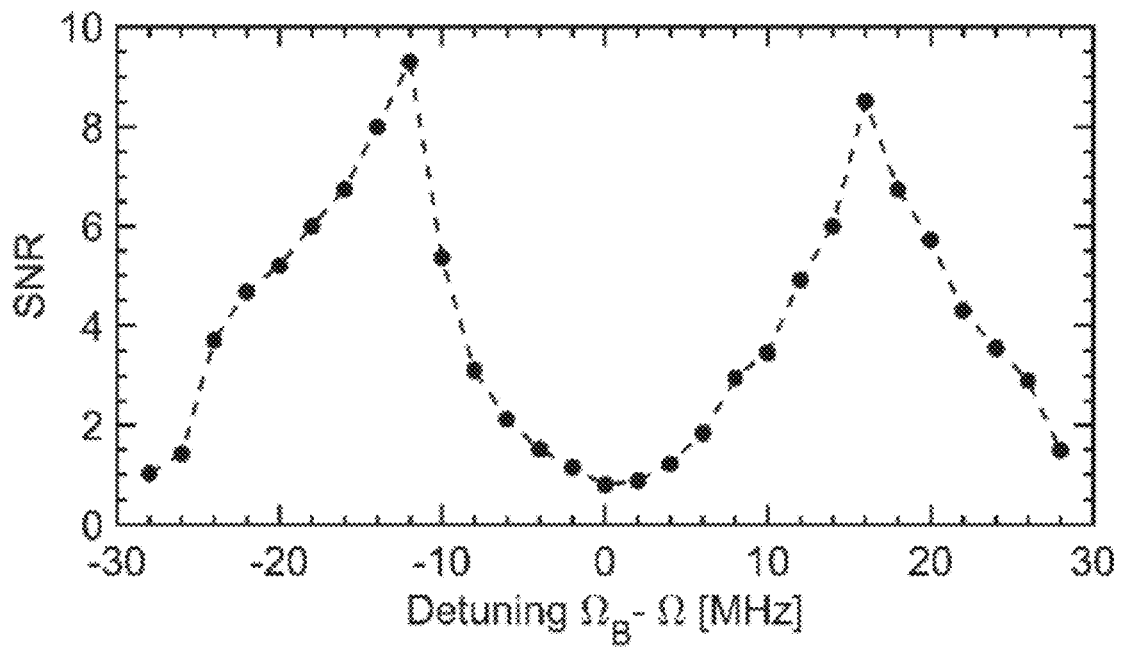
FIG. 10 shows experimental SNR versus Brillouin detuning using a loudspeaker excitation, as obtained in experiments performed according to some embodiments of the present invention.

In a further experiment, the piezoelectric crystal was replaced with a loudspeaker so that the signal is now vibration-induced, as opposed to strain-induced. The loudspeaker was modulated with an 80 Hz sine wave and applied directly to the fiber. The output power was measured for both the noise and the signal. The results are shown in FIG. 10, demonstrating an enhanced SNR of a factor of 10, depending on the vibration or strain signal strength. The SNR can be even further enhanced with a judicious selection of the Brillouin detuning.

Figure 11:
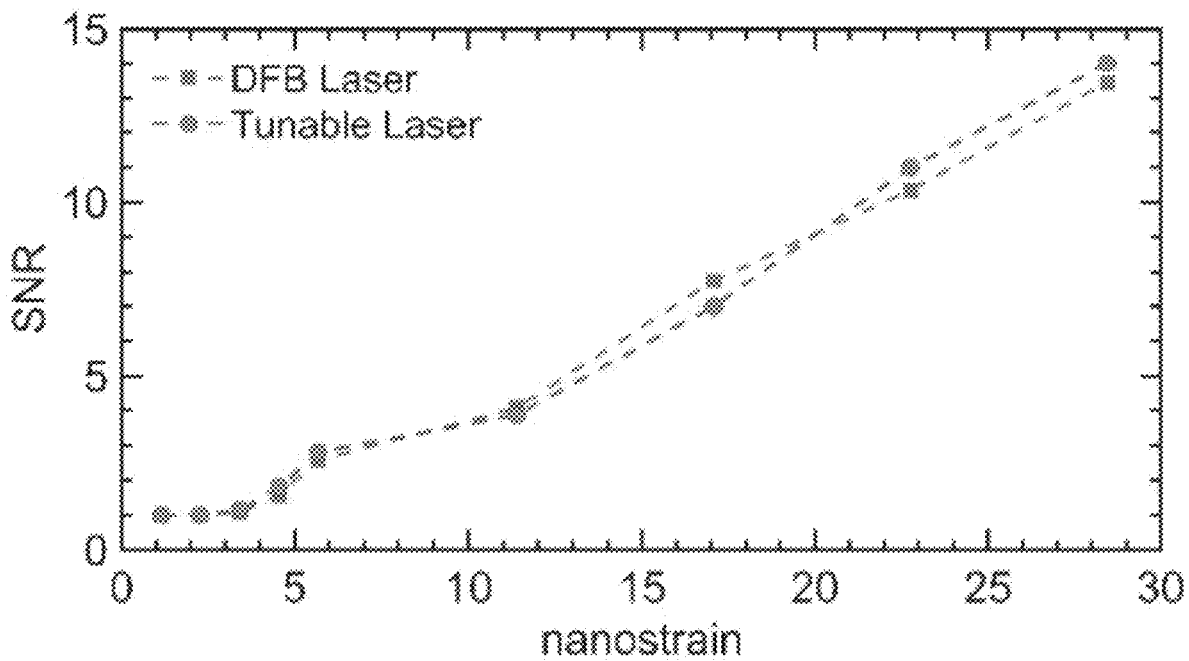
FIG. 11 shows SNR versus strain using two different types of laser sources, as obtained in experiments performed according to some embodiments of the present invention.

It is stressed that the experiments described in this Example were performed with both a relatively expensive tunable laser (Keysight N7714A) with a linewidth of 100 kHz and a much cheaper distributed feedback laser (DFB) laser (Rayscience WSLS-155007C1424-20) with a linewidth of 3 MHz. Both sources gave the same SNR enhancement with optimally detuned eBARS. For example, FIG. 11 shows the SNR versus piezo-induced strain for each of the two laser sources. Since the Brillouin amplifier is formed dynamically by the Stokes and pump interference, as long as the laser linewidth is narrower than the natural Brillouin bandwidth (on the order of 20 MHz), the Brillouin amplifier is automatically self-locked to the dynamics of the laser spectrum.

This Example presented a relatively inexpensive and sensitive technique for fiber-optic sensing. The technique is based on Brillouin detuning of the eBARS amplifier. This Example showed that judicious (e.g., optimal) detuning of the Brillouin resonance condition can lead to a significantly enhanced SNR, as compared to resonant eBARS or a filtered EDFA amplifier, and gives improved nanostrain sensitivity. This is due to the Brillouin bandwidth dependence on the Stokes and pump powers. This Example demonstrated that these results are achieved using an inexpensive DFB 3 MHz bandwidth laser, which gives the same SNR enhancement as a 100 kHz linewidth tunable laser.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

REFERENCES

1. C. A. Galindez-Jamioy and J. M. López-Higuera, J. Sens. 2012, 1 (2012).
2. L. Zhao, Y. Li, Z. Xu, Z. Yang, and A. Lü, Sens. Actuators A 216, 28 (2014).

3. J. C. Beugnot, M. Tur, S. Foaleng Mafang, and L. Thévenaz, Opt. Express 19, 7381 (2011).
4. A. A. Fotiadi and R. V. Kiyan, Opt. Lett. 23, 1805 (1998).
5. L. Alayn, B. David, and J. Garde Maria, Opt. Fiber Technol. 8, 24 (2002).
6. R. Pant, D. Marpaung, I. V. Kabakova, B. Morrison, C. G. Poulton, and B. J. Eggleton, Laser Photonics Rev. 8, 653 (2014).
7. S. Bloch, A. Lifshitz, E. Granot, and S. Sternklar, J. Opt. Soc. Am. B 30, 974 (2013).
8. Y. Dong, T. Jiang, L. Teng, H. Zhang, L. Chen, X. Bao, and Z. Lu, Opt. Lett. 39, 2967 (2014).
9. J. Urricelqui, M. Sagues, and A. Loayssa, IEEE Sensors Proceedings, Valencia, 2014, pp. 1776-1779
10. D. Mermelstein, E. Shacham, M. Biton, and S. Sternklar, Opt. Lett. 40, 3340 (2015).
11. M. Nikles, L. Thevenaz, and P. A. Robert, J. Lightwave Technol. 15, 1842 (1997).
12. S. Preussler and T. Schneider, Opt. Eng. 55, 031110 (2015).
13. L. Thévenaz, S. F. Mafang, and J. Lin, Opt. Express 21, 14017 (2013).
14. R. W. Boyd, Nonlinear Optics, 3rd ed. (Academic, 2008).

What is claimed is:

1. A method of optical sensing, comprising:
coupling an excitation optical signal into a first optical fiber to induce Rayleigh backscattering, thereby providing a backscattered signal;
optically amplifying said backscattered signal in said first optical fiber, by introducing a first pump light beam into said first fiber, thereby providing an amplified backscattered signal;
coupling said amplified backscattered signal into a second optical fiber, spatially separated from said first optical fiber; and
optically re-amplifying said amplified backscattered signal in said second optical fiber, by introducing a second pump light beam into said second fiber, thereby generating a sensing signal characterized by an enhanced signal-to-noise ratio over an entire length of said first fiber.

2. The method according to claim 1, wherein said first pump light beam and said excitation optical signal enter said first fiber from the same end thereof.

3. The method according to claim 1, wherein said second pump light beam and said amplified backscattered signal enter said second fiber from opposite ends thereof.

4. The method according to claim 1, wherein said second pump light beam and said amplified backscattered signal enter said second fiber from the same end thereof.

5. The method according to claim 1, further comprising transmitting said sensing signal into a signal analyzer, for analyzing said sensing signal so as to identify a change in at least one property along said first fiber.

6. The method according to claim 5, wherein said at least one property is a mechanical property.

7. The method according to claim 5, wherein said at least one property is a thermal property.

8. The method according to claim 5, wherein said at least one property is a chemical property.

9. The method according to claim 1, further comprising transmitting said sensing signal into a signal analyzer, for analyzing said sensing signal so as to identify a spatially-resolved change in at least one property along said first fiber.

10. The method according to claim 1, wherein at least one of said optically amplifying and said optically re-amplifying comprises employing Brillouin amplification.

11. The method according to claim 1, wherein at least one of said optically amplifying and said optically re-amplifying comprises employing Raman amplification.

12. The method according to claim 1, wherein said excitation optical signal is a pulsed optical signal.

13. The method according to claim 1, wherein at least one of said optically amplifying and said optically re-amplifying is an on-resonance optical amplification.

14. The method according to claim 1, wherein at least one of said optically amplifying and said optically re-amplifying is an off-resonance optical amplification.

15. The method according to claim 1, further comprising coherently interfering at least one of said amplified backscattered signal and said sensing signal with a reference beam.

16. A system for optical sensing, comprising:
a light source system configured for generating an excitation optical signal selected to induce Rayleigh backscattering, a first pump light beam and a second pump light beam;
an arrangement of optical couplers arranged for coupling said excitation optical signal and said first pump light beam into a first optical fiber, to provide an amplified backscattered signal, and for coupling said amplified backscattered signal and said second pump light beam into a second optical fiber, spatially separated from said first optical fiber, to thereby generate an optically re-amplified sensing signal; and
a signal analyzer, for analyzing said sensing signal so as to identify a change in at least one property along said first fiber.

17. The system according to claim 16, wherein said first pump light beam and said excitation optical signal enter said first fiber from the same end thereof.

18. The system according to claim 16, wherein said second pump light beam and said amplified backscattered signal enter said second fiber from the same end thereof.

19. The system according to claim 16, wherein said second pump light beam and said amplified backscattered signal enter said second fiber from opposite ends thereof.

20. The system according to claim 16, wherein said signal analyzer is configured for analyzing said sensing signal so as to allow identifying a spatially-resolved change in at least one property along said first fiber.

* * * * *